UNITED STATES PATENT OFFICE.

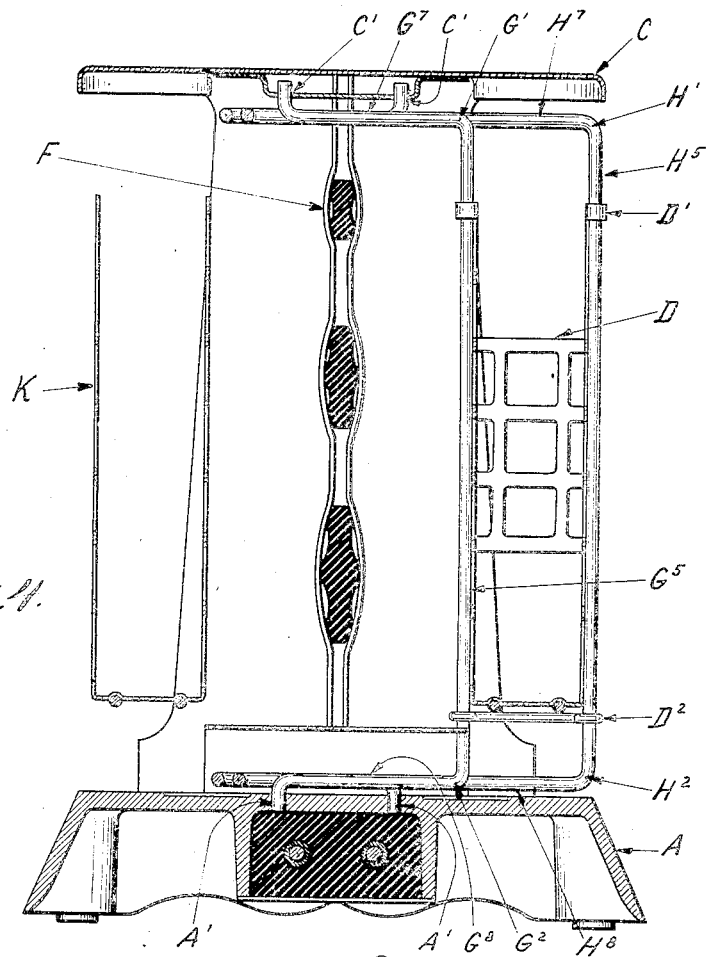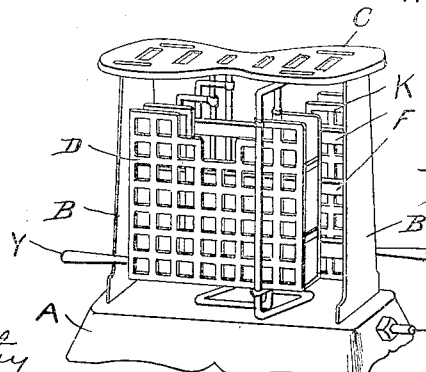

FREDERICK WILLIAM COLLIER, OF WORCESTER, MASSACHUSETTS, ASSIGNOR TO ECONOMY APPLIANCE COMPANY, OF MARLBORO, MASSACHUSETTS, A CORPORATION OF MASSACHUSETTS.

TOASTER.

1,358,932.      Specification of Letters Patent.      Patented Nov. 16, 1920.

Application filed February 15, 1917. Serial No. 148,811.

*To all whom it may concern:*

Be it known that I, FREDERICK WILLIAM COLLIER, a citizen of the United States, residing at Worcester, in the county of Worcester and State of Massachusetts, have invented certain new and useful Improvements in Toasters, of which the following is a specification.

My invention relates particularly to the type of toasters known as two slice toasters and consists in a device to hold the slices of bread to be toasted in such a manner that the slice may be turned to present the opposite surface to the heating element without removing the slice from the holder.

Reference will now be had to the accompanying drawing, like characters representing like parts.

Fig. 4 is a vertical cross section of the toaster through the line $1-1^a$.

Fig. 5 is a perspective view showing the toaster in position for operation.

Figure 1:
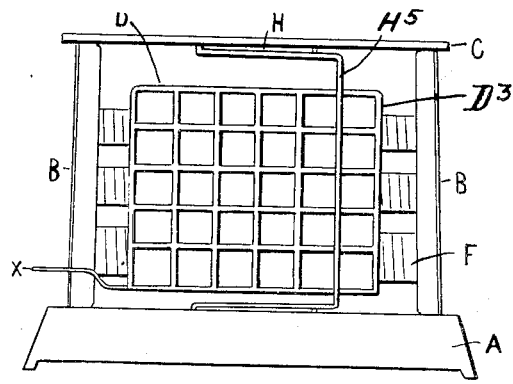
Figure 1 represents the toaster in side elevation.

In Fig. 1, A represents the base, B, the uprights, and C, the top of a toaster, and F represents the heating element which may be of any well known type, either gas or electrically heated.

Figure 2:
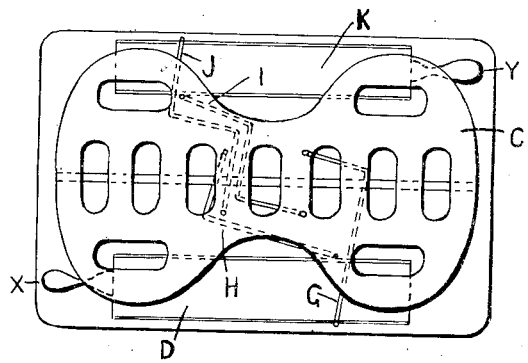
Fig. 2 represents a plan view of the toaster with both slice holders in toasting position.

The slice holders, D, and K, Fig. 2, are vertically placed, lateral to but parallel with the heating element and at suitable distance therefrom, and held in their proper position by the members G, H, and I, J, respectively. These members, G, H, and I, J, are rights and lefts respectively, but as seen, in Fig. 1, are in essential formation crank shafts, pivoting at the ends thereof in the top and bottom of the toaster, and through their central portions, one on each side, respectively, of the slice holders. It is evident, then, that the slice holders when at rest are supported by these members, and when being reversed in position turn about these members, while the members themselves correspondingly turn about their own pivots in the top C and the bottom A.

Figure 3:
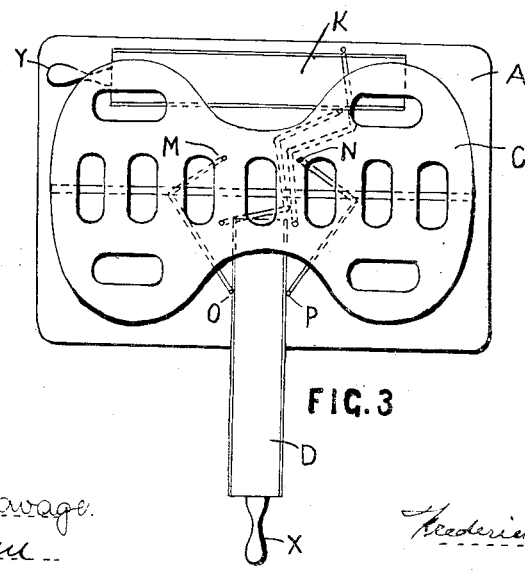
Fig. 3 represents a plan view of the toaster with one of the slice holders reversed from the position in Fig. 2 and the other in neutral position ready to receive the slice.

Furthermore, in order that pressure upon a handle, as X, shall result in reversing a slice holder through 180 degrees, it is necessary that the distance between the centers $O'$ and $P'$ shall be less than between M and N; and for the best results this difference should be marked, as otherwise it would be difficult or even impossible to pass the slice holder by the neutral position shown in Fig. 3.

The construction of my invention is such that when one side of a piece of bread has been sufficiently toasted, a simple pushing or pulling of the handle of the slice holder, according to the position to be desired, will cause the slice holder to turn upon itself, so to speak, so that the position of the slice holder with relation to the side of the heater to which it was parallel before being turned is reversed; and the untoasted side of the bread slice is brought into position to be toasted at that side of the heater. This result is attained by a form of construction and consequent operation that are unique.

The combination and arrangement of parts for which it is desired to obtain Letters Patent are those which bring about a reversal of the bread slice with relation to that heating surface of the toaster with which it was parallel when one side of the slice was being toasted. In order to bring this about, I provide a carrier member forming, in fact, a crank shaft, and each end of the carrier member is bent to form a tongue $H^3$ and $H^4$ and these tongues are movably fitted into holes $C^1$ and $A^1$ in the top and bottom of the toaster frame. When the carrier member is mounted in these holes by means of the tongues the part $H^5$ of the carrier member between the right angles $H^1$ and $H^2$ is vertical and forms a shaft on which is movably mounted the slice holder D, as at $D^1$ and $D^2$. It will be seen readily that the carrier member H is rotatable in the holes $C^1$ and $A^1$ and that the slice holder D is rotatable on the shaft $H^5$. Having in mind these two positions it will be seen that it is necessary to mount the slice holder D on the shaft $H^5$ at a position near enough to the rear end $D^3$ of the slice holder D, that is, at the end opposite the handle X, and to have the horizontal arms $H^7$ and $H^8$ of the carrier member or crank shaft of sufficient length to allow the rear end $D^3$ of the slice holder freedom of passage by the face or heating surface F¹ of the heater F, in order to reverse the position of the holder D and its bread slice. Furthermore, in order that pressure upon the handle shall result in reversing the slice holder through 180 degrees it is necessary that the distance between the centers O' and P' shall be less than between M and N; and for the best results this difference should be marked, as otherwise it would be difficult or even impossible to pass the slice holder by the neutral position shown in Fig. 3.

The reversal of the position of the slice holder can be brought about by the use of one such carrier member as I have described; that is, the desired motion can be obtained. But in order to retain the slice holder in any desired position, I provide a second carrier member G, which is affixed to the slice holder and to the top and bottom of the toaster in the same manner as the carrier member H is affixed thereto, but on the opposite side of the slice holder, as shown in Fig. 3, letters O and P. The slice holder is mounted on the carrier members G and H so that the upright shafts $G^5$ and $H^5$ of the carrier members are in the same vertical plane, which plane is at right angles to the horizontal length X—$D^3$ of the holder D. The holes $C^1$ and $A^1$, $C^2$ and $A^2$, in the top and bottom of the toaster are in the same vertical plane. This plane is parallel to the heating surface $F^1$ of the toaster F; and when the holder is in position for toasting, the first mentioned plane is perpendicular to the latter plane. Such positioning of the parts overcomes any tendency of the parts to bind and allows freedom of movement; but the parts may be otherwise positioned without changing the principle of my invention.

In order to distinguish clearly between the previous devices and my device, suppose that the slice holder D is in open position and ready to receive a slice of bread, as in Fig. 3. In this position the holder stands in a vertical plane perpendicular to and in front of the heating surface $F^1$, at which the slice is to be toasted, while in the previous devices it is positioned between two adjacent surfaces toward each of which it must be moved alternately in order to toast the bread slice on both sides. In my device, from the open position referred to, one of the sides of the bread slice is brought into toasting position by turning the handle X to the right or left. Then, after one side has been toasted, the other side is presented to the same toasting surface at which the first side was toasted, by causing the holder to resume its open position and continuing the movement of the handle to the opposite extreme position as shown in the drawings. In reversing the position of the slice holder the front end X describes a curve of an elliptical nature and the rear end $D^3$ describes a curve that resembles an elongated letter S. The holders in the previous devices move in the arc of a circle only, on a simple hinged device. The movements in my invention are brought about by the combination of parts as described.

I have described the carrier member as having two horizontal parts between which is a vertical part on which is positioned the slice holder; and my description of the parts and the working thereof applies to one slice holder and one toasting surface. In practice it is convenient to have two or more toasting surfaces and in the devices now in use two toasting surfaces parallel to each other are common. In such a device my holder may be duplicated, except in relation to the horizontal parts of the carrier members. It is obvious that unless altered so that these parts will pass and repass each other there will be interference of the horizontal parts of the carriers in operating the device. In order to overcome this difficulty the tongues on the ends of one set of carrier members may be lengthened so that the horizontal parts of that set will pass by the horizontal parts of the other set. This is one of the methods that may be used. And it is obvious that the form of the carrier members may be otherwise altered, as by changing their shapes, by joining separate pieces at $H^1$ and $H^2$ and at similar places and otherwise, without changing the principle of my invention relating to the reversal of the slice holders. In practice, I provide the following method which is effective and allows each holder to assume any position regardless of the position or motion of the other and allows both to move in any direction or in opposite directions at the same time. It also permits the horizontal parts to move in the same horizontal plane; which adds materially to the simplicity of construction and operation of the whole device. Instead of providing straight horizontal top and bottom parts, as $H^7$, $H^8$, etc., of the carrier members, I bend the top and bottom parts of one set of carrier members outward, that is, toward the ends of the heater, as G, H, in Figs. 2 and 3, and the horizontal parts corresponding therewith, as I and J in the other set, I bend inward, as shown in Figs. 2 and 3. This provides a clearance for all of the horizontal parts of each set of carrier members about the pivots or hinged parts $C^1$, $A^1$, etc., and about the horizontal parts in the other set of carrier members so that the carrier members will move freely, as described.

Claims—

1. In a toaster, the combination of a heating element, a slice holder and a plurality of axes for supporting the slice holder, whereby the slice holder is movably mounted in such a manner with relation to the heating element that either side of the slice holder can be presented to the heating element.

2. In a toaster, the combination of a heating element having a plurality of heating surfaces, a plurality of slice holders and a plurality of axes for supporting the slice holders whereby the slice holders are movably mounted in such a manner with relation to the heating element that either side of a slice holder can be presented to the same surface of the heating element.

3. In a toaster, the combination of a heating element having a plurality of heating surfaces, a plurality of slice holders, and a plurality of axes for supporting the slice holders, whereby the slice holders are movably mounted in such a manner with relation to the heating element that each slice holder is reversible with relation to that heating surface to which the slice holder is first presented.

4. In a toaster, the combination of a heating element having a plurality of heating surfaces, a plurality of slice holders, and a plurality of axes for supporting the slice holders whereby the slice holders are movably mounted in such a manner with relation to the heating element as to be within their own space limits reversible with respect to the heating surface of the heating element to which the slice holders are first presented.

5. In a toaster, the combination of a heating element having a plurality of heating surfaces, a plurality of slice holders, axes and carrier members for supporting the slice holders whereby through a compound movement about the axes the placement and angular positions of the slice holders with relation to the heating element are brought about and at all times controlled.

6. In a device of the class described, the combination of a heating element having a plurality of heating surfaces, and a plurality of carrier members and slice holders and a plurality of axes for supporting the carrier members and slice holders whereby the carrier members and slice holders are movably mounted in such a manner that each slice holder is reversible with relation to the heating surface to which it is first presented.

7. In a device of the class described, the combination of a heating element having a plurality of heating surfaces, a plurality of carrier members and slice holders and a plurality of axes for supporting the carrier members and slice holders whereby the carrier members and slice holders are movably mounted in such a manner with relation to the heating element and with relation to each other that the slice holders are reversible with respect to the heating surface of the heating element to which they are first presented, irrespective of the positions or movements of the other slice holder or holders.

8. A device of the class described having a heating element with a plurality of heating surfaces, a plurality of carrier members and slice holders, horizontal arms on the carrier members, and a plurality of axes for supporting the slice holders and carrier members, the horizontal arms of the carrier members being so shaped and adjusted with relation to each other and to the heating element, and the slice holders and carrier members being so mounted on the axes that the slice holders are reversible with relation to the heating surfaces of the heating element to which they are first presented, irrespective of each other or their motions or positions.

9. In a device of the class described, the combination of a heating element having a plurality of heating surfaces, a plurality of carrier members and slice holders and a plurality of axes for supporting the carrier members and slice holders whereby the slice holders are so mounted with relation to the heating element that each slice holder is reversible by means of a motion which causes the major part of the holder to at first recede from and then to approach the heating element.

FREDERICK WILLIAM COLLIER.

Witnesses:
ELIZABETH E. SAVAGE,
H. ENIOMEAN.